(12) United States Patent
Jaffri et al.

(10) Patent No.: US 7,873,341 B2
(45) Date of Patent: Jan. 18, 2011

(54) SYSTEM AND METHOD FOR ADAPTIVE POLARIZATION DIVERSITY BETWEEN CLOSELY SPACED ANTENNAS

(75) Inventors: Rehan Jaffri, New York, NY (US); Richard Knadle, Dix Hills, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 616 days.

(21) Appl. No.: 11/947,343

(22) Filed: Nov. 29, 2007

(65) Prior Publication Data

US 2009/0143026 A1 Jun. 4, 2009

(51) Int. Cl.
*H04B 7/00* (2006.01)
*G01R 29/08* (2006.01)

(52) U.S. Cl. .................. 455/273; 455/278.1; 343/703

(58) Field of Classification Search .............. 455/63.4, 455/269, 272, 273, 276.1, 277.1, 274, 121, 455/278.1; 343/702, 703, 853, 756
See application file for complete search history.

(56) References Cited

U.S. PATENT DOCUMENTS

| 2002/0033773 | A1* | 3/2002 | Hirabayashi | 343/702 |
|---|---|---|---|---|
| 2003/0092379 | A1 | 5/2003 | Brothers, Jr. et al. | |
| 2007/0188390 | A1* | 8/2007 | Dunn et al. | 343/702 |
| 2008/0111748 | A1* | 5/2008 | Dunn et al. | 343/702 |
| 2008/0129613 | A1* | 6/2008 | Ermutlu et al. | 343/703 |
| 2008/0129641 | A1* | 6/2008 | Lee et al. | 343/876 |

OTHER PUBLICATIONS

Cushcraft Corporation, "Antenna Properties and Their Impact on Wireless System Performance," <URL: http://www.cushcraft.com/comm/support/pdf/Antenna-properties-an-14998.pdf>, Aug. 2003, pp. 1-19.

* cited by examiner

*Primary Examiner*—Blane J Jackson (57) ABSTRACT

An electronic device comprises a transceiver and a probe. The transceiver is connected to a first antenna and a second antenna. The first and second antennas are configured to one of transmit and receive radio frequency signals. The first and second antennas are configured to exhibit a polarized diversity. The probe re-establishes the polarized diversity when the polarized diversity has been disrupted.

20 Claims, 4 Drawing Sheets

SYSTEM AND METHOD FOR ADAPTIVE POLARIZATION DIVERSITY BETWEEN CLOSELY SPACED ANTENNAS

FIELD OF THE INVENTION

The present invention relates generally to a system and method for adaptive polarization diversity between closely spaced antennas. Specifically, an optimal polarization orthogonality is adaptively reestablished through a use of probes.

BACKGROUND

A mobile unit may be equipped with a transmitter, a receiver, a combination thereof, or a transceiver. The transmitter and transceiver may enable the mobile unit to transmit signals. For example, the transceiver may propagate radio frequency (RF) signals to transmit data to another mobile unit, to connect to a network, etc. The propagation of RF signals may experience errors from a variety of reasons such as reflection of the RF signals off of surfaces, meaning there are usually a "direct signal" and an "indirect signal" simultaneously present (i.e., the multi-path problem). These errors may include an improper transmission of the RF signals such as a corruption of the RF signals (e.g., inter-symbol distortion), a complete failure in the transmission of the RF signals due to, for example, multi-path nulling (e.g., signal drop out), etc.

One method of improving signal reception is to alter the method of reception and/or transmission of the signals. One such method is antenna diversity. Antenna diversity may involve alternating one antenna from a plurality of antennas to perform the transmission/reception (i.e., switching technique) and a receiver or a transmitter receiving or transmitting the combination of the input or output from two or more antennas. In certain instances, the amplitude and the phase of the coupling coefficients of the antenna elements are combined (i.e., "phased array antenna" technique or "electronic beam steering" technique). In either case, the multiple antennas or the individual elements of the combined antenna array may be separated using a predetermined distance and/or have different polarizations so that the total signal and the noise received at one antenna is substantially uncorrelated to the total signal and the noise received at the other antenna. The antenna or antennas of the transmitter may be correlated so that a reception of the correlated inputs from the antenna or antennas of the transmitter are received by two or more antennas of the receiver. The correlated signal inputs may be added in a vector manner while the substantially uncorrelated noise is only partially added and partially subtracted. Thus, the signal-to-noise ratio is improved, the signal corruption due to inter-symbol distortion is minimized, and the signal processed in this way may be decoded more efficiently. However, errors such as those described above still exist.

SUMMARY OF THE INVENTION

The present invention relates to an electronic device comprising a transceiver and a probe. The transceiver is connected to a first antenna and a second antenna. The first and second antennas are configured to one of transmit and receive radio frequency signals. The first and second antennas are configured to exhibit a polarized diversity. The probe re-establishes the polarized diversity when the polarized diversity has been disrupted.

DETAILED DESCRIPTION

The exemplary embodiments of the present invention may be further understood with reference to the following description and the appended drawings, wherein like elements are referred to with the same reference numerals. The exemplary embodiments of the present invention describe a system and method for adaptive polarization diversity. Specifically, the exemplary embodiments of the present invention may pertain to a mobile unit (MU) transmitting and/or receiving signals using an adaptive diversity scheme. That is, two or more antennas are used to transmit or receive signals dynamically. Furthermore, the adaptive diversity scheme utilizes a polarization orthogonality. According to the exemplary embodiments of the present invention, probes may be used to continually establish the polarization orthogonality. The MU, the adaptive diversity, the two or more antennas, the polarization orthogonality, and the probes will be discussed in more detail below.

Antenna diversity is a prevalent system to incorporate into MU technology. Antenna diversity may be present on a transmitting MU, a receiving MU, or both MUs. With the transmitting MU, the intentional use of multipath propagation of correlated radio frequency (RF) signals may better ensure that another MU receives the transmitted signals with a higher signal-to-noise ratio or a higher signal-to-inter-symbol distortion ratio. RF signals may experience various types of interference along a path to another MU. By propagating the RF signals in multiple paths, the other MU has the possibility of an increased percentage of receiving the signal correctly. With the receiving MU, multipath reception of correlated RF signals may increase the percentage of a proper reception if proper receiving antenna techniques are used. If a transmitted RF signal experiences an interference where a phase of the signal is affected, the first antenna may receive the signal as intended while the other antenna may receive the signal at the interfered phase. With the transmitting MU and the receiving MU having antenna diversity, both advantages may be realized.

Those skilled in the art will understand that most of the RF signals that are being used in most environments are propagated as waves that are in the presence of multi-path conditions. Consequently, positional nulls may result in transmission or reception (e.g., RF waves from a first antenna are out of phase with RF waves from a second antenna). Diversity techniques have been developed in an attempt to eliminate these positional nulls. In a first example, the two antennas may include a positional diversity. Positional diversity may entail changing a position of one or both antennas in any direction (e.g., X, Y, or Z). In a second example, the two antennas may include a polarization diversity. Polarization diversity may entail utilizing an orientation of an electric field of the antenna (i.e., E-plane) (e.g., horizontal plane, vertical plane, etc.). In a third example, the two antennas may include a frequency diversity. Frequency diversity may entail controlling a frequency at which the RF signals are propagated so that the nulls are not created. In a fourth example, the two antennas may be electronically steered into an antenna pattern. In a fifth example, the two antennas may include a time diversity. Time diversity may entail controlling when the RF signals are propagated so that the signals reach the destination at different times, thereby reducing any nulls.

Because MU technology has allowed an ever decreasing size of the MU, the antennas may be disposed in limited locations. Consequently, several diversity schemes may not be as effective. For example, the antennas may be disposed so close to one another that cause a strong coupling between the antennas, thereby losing much of the potential benefit of positional diversity. The coupling of the closely placed antennas may cause the multiple antennas to not work independently, thereby losing much of the potential benefit of the diversity scheme. The smaller size of the MU results in a closer spacing than may be desired between the diversity antennas that are mounted within the MU. The closer spacing causes an increased RF coupling between the antennas, resulting in a higher difficulty to achieve the desired antenna-to-antenna isolation. The desired antenna-to-antenna isolation may still be achieved by the use of orthogonal polarization between the antennas. Polarization diversity may still be achieved in close proximity but may be difficult and hindered when other hardware or interferences (e.g., user's fingers) may be present.

Figure 1:
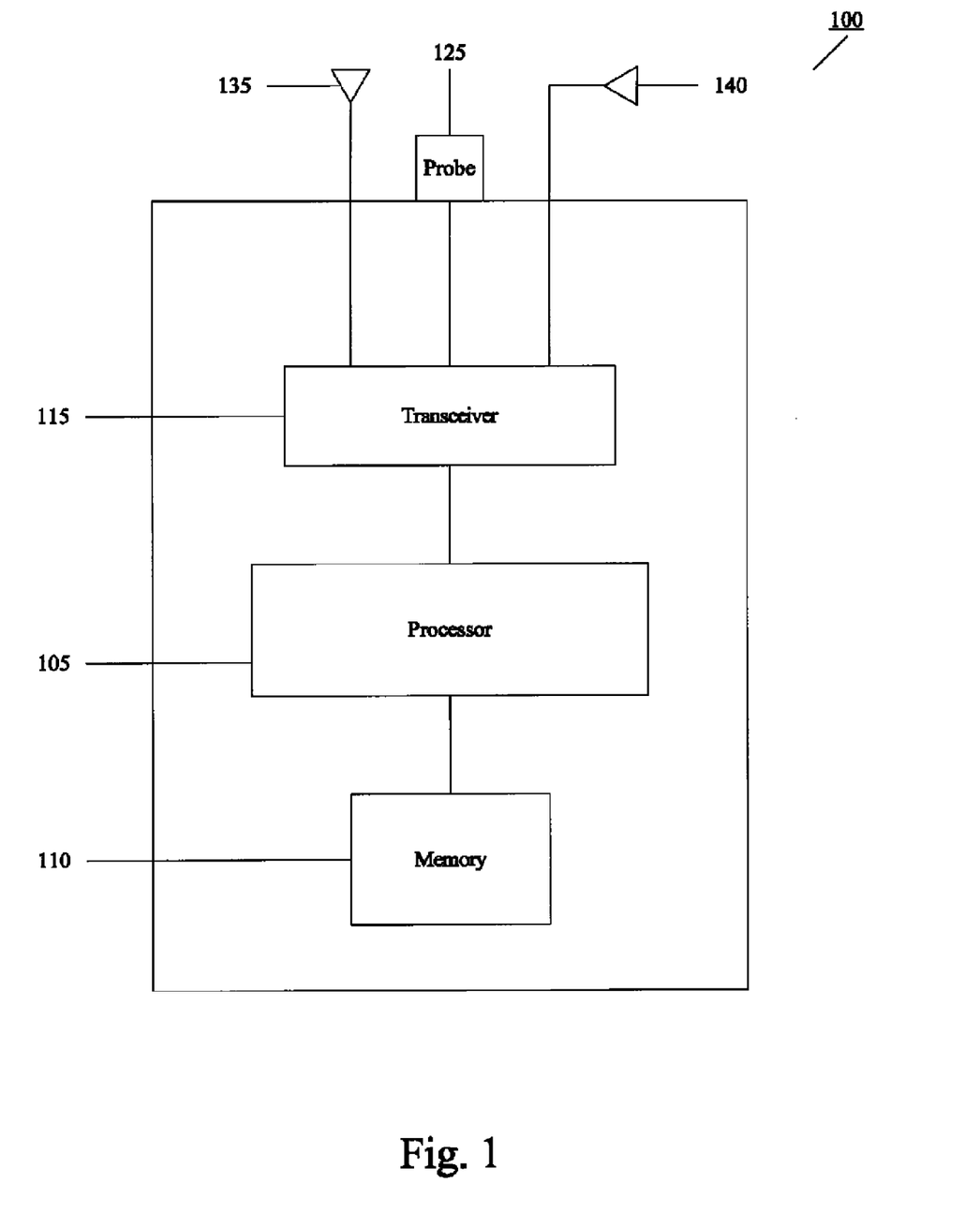
FIG. 1 shows components of a mobile unit according to an exemplary embodiment of the present invention.

FIG. 1 shows components of an MU 100 according to an exemplary embodiment of the present invention. The MU 100 may be any portable electronic device that utilizes the adaptive diversity scheme of the present invention. For example, the MU 100 may be a laptop, a pager, a cell phone, a radio frequency identification device, a scanner, a data acquisition device, an imager, etc. It should be noted that the use of the MU 100 is only exemplary. That is, the exemplary embodiments of the present invention may be applied to any electronic device that utilizes antenna diversity, specifically when the multiple antennas are placed in a relatively close proximity to one another. According to the exemplary embodiments of the present invention, the components of the MU 100 may include at least a processor 105, a memory 110, a transceiver 115, a probe or multiple probes 125, a first antenna 135, and a second antenna 140. It should be noted that the MU 100 may include, for example, multiple transceivers, further antennas, etc. It should also be noted that other orthogonal polarization pairs of antennas may be disposed on or within the MU 100.

The processor 105 may be responsible for executing various functionalities of the MU 100. Specifically, according to the exemplary embodiments of the present invention, the processor 105 may be responsible for the adaptive diversity scheme through control of the components involved in the adaptive diversity scheme. The memory 110 may be a storage unit for the MU 100. Specifically, the memory 110 may store data and/or settings pertaining to the adaptive diversity scheme and other various programs such as the operating system, a word processing program, etc. The memory 110 may be any type of volatile memory, non-volatile memory, or combination thereof. The MU 100 may include other components such as a battery to supply the necessary energy to operate the MU 100.

The transceiver 115 may be a component of the MU 100 that controls the transmission and/or reception of signals. The signals that are transmitted and/or received may be RF signals. For example, the transceiver 115 may be used to connect the MU 100 to a wireless network, another MU, etc. The transceiver 115 may control the signals that are emitted through the antennas 135, 140. The following description pertains to when the transceiver 115 with the antennas 135, 140 is transmitting RF signals (i.e., the MU 100 is in a transmitting mode). However, it should be noted that the following description may also pertain to when the MU 100 is in a receiving mode. It should also be noted that the use of the transceiver 115 is only exemplary. For example, if the MU 100 is only capable of transmitting RF signals, the MU 100 may include transmitters instead of transceivers. In another example, if the MU 100 is only capable of receiving RF signals, the MU 100 may include receivers instead of transceivers. In yet another example, the MU 100 may include a transmitter and a receiver.

Furthermore, it should be noted that the use of a single transceiver and two antennas is only exemplary. Those skilled in the art will understand that with antenna diversity schemes, a single transceiver may have two or more antennas, two or more transceiver/antenna combinations, etc. may be included in the MU 100. For transmitting purposes, as discussed above, the transmission signals are correlated so that a receiving MU may combine the signals, thereby increasing a percentage of properly receiving the data. Thus, at least two antennas from a single transceiver send the same RF signals.

As illustrated in the exemplary embodiment, the antennas 135, 140 may be disposed at least partially within the MU 100 and extend outside a housing of the MU 100. The antennas 135, 140 may also be wholly within the MU 100 (i.e., the antennas 135, 140 are internal) such as being disposed on a printed circuit board of the MU 100. In either embodiment, the antennas 135, 140 may achieve several types of antenna diversity schemes. For example, the antennas 135, 140 may be spaced far enough apart that they do not couple. Thus, the antennas 135, 140 may be sufficiently placed to be isolated, thereby establishing a positional diversity. In another example, the transceiver 115 may feed the antennas 135, 140 using different frequencies, thereby establishing a frequency diversity. In yet another example, the processor 105 may dictate that the transceiver 115 transmit the signals with a predetermined time gap, thereby establishing a time diversity.

Figure 2A:
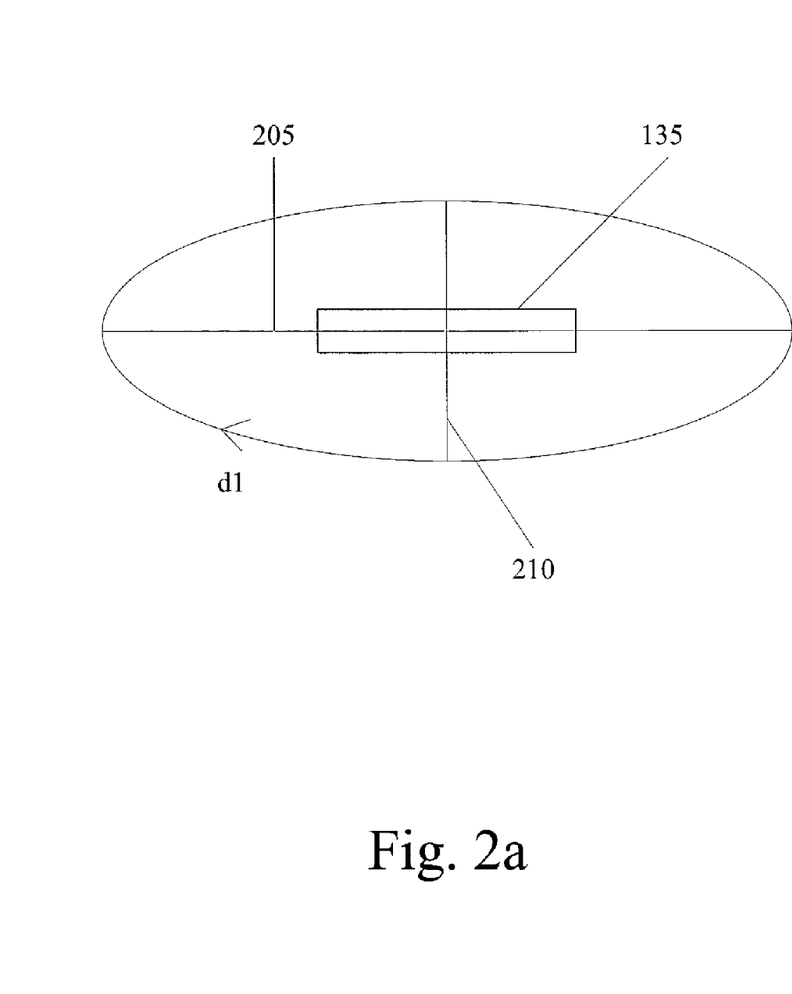
FIG. 2a shows a horizontal, elliptical electric field vector for a first antenna according to an exemplary embodiment of the present invention.
Figure 2B:
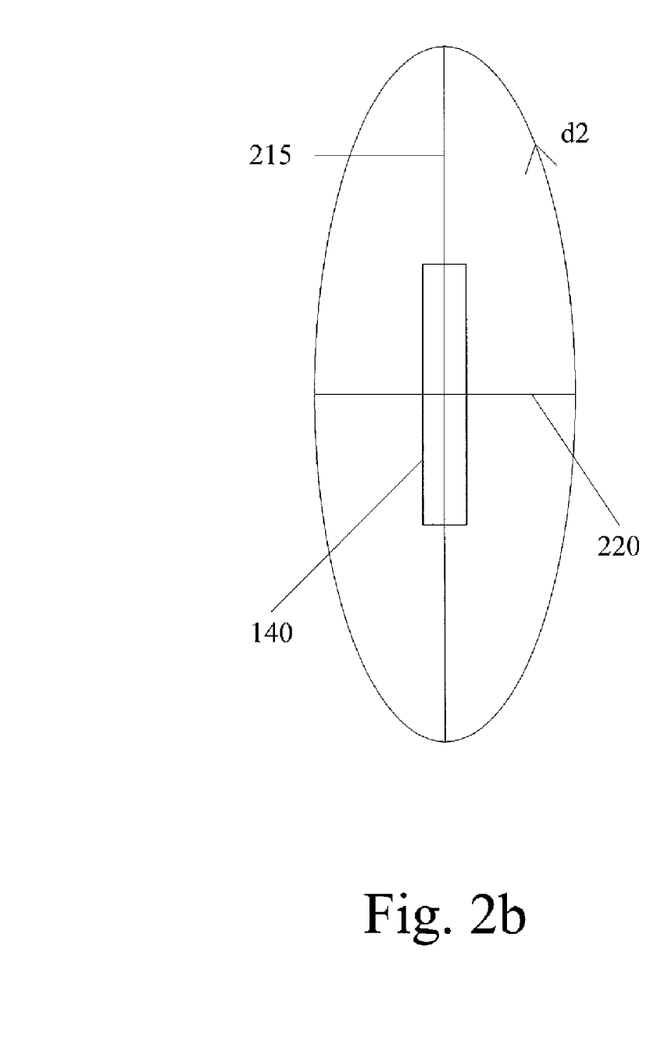
FIG. 2b shows a vertical, elliptical electric field vector for a second antenna according to an exemplary embodiment of the present invention.

The antennas 135, 140 may also be disposed on the MU 100 to establish a polarization diversity. Specifically, the polarization diversity may be established orthogonally. For example, the orthogonality may be horizontal and vertical polarization, 45° right and 45° left linear polarization, clockwise and counter-clockwise circular polarization, elliptical clockwise and elliptical counter-clockwise polarization having an equal axial ratio, etc. That is, the propagation of the RF signals from the antennas 135, 140 may be in perpendicular planes or otherwise orthogonal, when the characteristics between the antennas are assessed locally. FIGS. 2a-b shows one embodiment in which the antennas 135, 140 may include an elliptical polarization type of an orthogonal polarization diversity. Complete orthogonality is demonstrated because the polarization senses are opposite (e.g., clockwise and counter-clockwise), each polarization has axial ratios that are equal, and each polarization has a major axis that is orthogonal. Such a pair of antennas 135, 140 are completely decoupled from each other if facing each other in a free space environment.

It should be noted that all antennas have an "uninstalled performance" and an "installed performance." That is, a gain, an antenna pattern, an axial ratio, a voltage standing wave ratio (VSWR), an angle of the major axis, etc. of an individual antenna may change, for example, when the antenna is transferred from the free space environment that is often used during antenna development to the final environment that exists within the MU 100. It may be possible to re-establish polarization orthogonality between pairs of antennas (and thus the isolation) after installation within the MU 100 if it was possible to physically rotate at least one of the antennas in azimuth, elevation, or polarization. However, the physical constraints of the antenna positioning within the MU 100 may prevent this. Therefore, the exemplary embodiments of the present invention re-establishes the polarization orthogonality by electronic means through use of an electronic probe, or multiple probes that are mounted in the vicinity of either antenna of the orthogonal pair. It should further be noted that the term "polarization orthogonality" has at least two meanings in this instance. A pair of installed antennas may have the property of being orthogonal in polarization between the pair (and thus being electronically isolated within the MU 100). This may be referred to as "locally orthogonal" or "near-field orthogonal." It should be noted that the antennas may not appear to be completely orthogonal in polarization characteristics when viewed individually by way of the signal each antenna transmits/receives to/from a particular point of observation that is in the environment outside of the MU 100. This may be referred to as "far-field orthogonality". In this instance, it is more important for near-field orthogonality to exist, because this property will achieve the electronic isolation between the antennas. When electronic isolation exists between an antenna pair, there are at least two benefits: (1) the signals that are emitted (or received) by the two antennas are almost completely independent, raising the diversity benefit that will occur when switching between the antennas; and (2) with sufficient isolation between an antenna pair, it becomes advantageous to use them as a bi-static RFID reader. This is where one antenna is connected to the transmitter, and the other is connected to the receiver, as opposed to a mono-static RFID reader where a single antenna is shared between the transmitter and the receiver. The benefit of the bi-static approach is an increased receiver sensitivity and less intermodulation distortion that is experienced in a dense-reader environment since less of the transmitted signal enters the receiver to causes dynamic range blocking.

FIG. 2a shows a horizontal, elliptical electric field vector for the antenna 135 according to an exemplary embodiment of the present invention. Specifically, FIG. 2a may illustrate the antenna 135 as it is disposed on the MU 100 of FIG. 1. That is, the portion of the antenna 135 that generates the electric field vector may be substantially horizontal. FIG. 2b shows a vertical, elliptical electric field vector for the antenna 140 according to an exemplary embodiment of the present invention. Specifically, FIG. 2b may illustrate the antenna 140 as it is disposed on the MU 100 of FIG. 1. That is, the portion of the antenna 140 that generates the electric field vector may be substantially vertical. Those skilled in the art will understand that the horizontal and vertical disposition of the antennas 135, 140 and the corresponding electric field vectors are only exemplary. That is, the horizontal and vertical disposition may readily show the orthogonality. Thus, the disposition of the antennas 135, 140 may be in other configurations where an orthogonality is established. Those skilled in the art will also understand that an RF signal transmitted by an antenna naturally has an electric field that is created. It should also be noted that the electric field is integrally related to the transmitted RF signal.

The electric field vectors of the antennas 135, 140 may rotate in opposite directions when the antennas 135, 140 have equal axial ratios and are elliptically polarized. As illustrated, the antenna 135 may rotate in direction d1 (i.e., clockwise) while the antenna 140 may rotate in direction d2 (i.e., counter-clockwise) when viewed in the +Z direction of propagation. Those skilled in the art will understand that most linearly polarized antennas may have a cross-polarized radiation component. Consequently, the antennas may emit a signal that has elliptical polarization of a particular axial ratio. Thus, polarization orthogonality may involve creating an emitted signal at antenna 135 that is equal in axial ratio with a major axis that is orthogonal and with a polarization sense that is opposite with respect to antenna 140. That is, the axial ratio may involve a proportion of the major axis 205 and minor axis 210 of the electric field vector of the antenna 135 and a proportion of the major axis 215 and minor axis 220 of the electric field vector of the antenna 140. The proportions of the major and minor axes of the antennas 135, 140 may be equal.

It should be noted that the electric field vectors illustrated in FIGS. 2a-b are pure polarization diversity vectors in free space (i.e., uninstalled performance). That is, the electric field vectors are not subject to any type of interference such as other components of the MU 100, a user's hand, etc. For example, in the presence of a ground plane underneath a printed circuit board, the elliptic polarization would not be as ideal.

According to the exemplary embodiments of the present invention, the antennas 135, 140 may be placed at predetermined locations on or within the MU 100. To determine the predetermined locations, the antenna 135 may be placed arbitrarily on the MU 100. Subsequently, a polarimetry (i.e., the three dimensional polarization characteristics) at a phase center of the antenna 140 is found when the antenna 135 is transmitting. The antenna 140 may then be placed at an appropriate location and orientation to achieve a best coarse orthogonality and further achieve a best coarse polarization diversity.

In a preferred embodiment, the antennas 135, 140 may be two balanced antennas (e.g., dipoles, loops, patch, etc.) that do not work off a ground plane. In another embodiment, at least one antenna may be a balanced antenna while the other antenna may be "unbalanced." That is, the "unbalanced" antenna may work off a ground plane such as a monopole or a PIFA (printed inverted F antenna) which needs a counterpoise that absorbs and re-radiates. The counterpoise may also be viewed as a mirror-like surface that creates the other half of a dipole, e.g., by way of an image. In reality, an RF current may only be launched into an unbalanced antenna section by subtracting an equal current from an adjacent structure (i.e., the counterpoise). This phenomenon is similar to Newton's third law of "action but equal and opposite reaction".

As discussed above, the propagation from the antennas 135, 140 may experience interference in many forms. In particular, the propagations may be affected in a near field radiation pattern from, for example, components of the MU 100, a user's hand, etc. Returning to FIG. 1, the MU 100 may further include a probe 125. According to the exemplary embodiments of the present invention, the probe 125 may control a manner in which the propagation between the antenna pair occurs. In the exemplary embodiment, the probe 125 may be located near either of the antennas 135, 140 or within the structure of either of the antennas 135, 140. The probe 125 may be a compound device having two separate ports that are at least partially orthogonal to each other. These ports may receive signals indicating the proper amplitude and RF phase angle (e.g., 45°, 90°, etc.) at each of the ports to electronically establish greater orthogonality and, thus, greater antenna-to-antenna isolation. Subsequently, the probe 125 may actively re-establish the orthogonality.

According to the exemplary embodiments of the present invention, the probe 125 may be substantially similar to the antennas 135, 140. That is, the probe 125 may be a third antenna for the MU 100. However, when a polarization diversity needs to be re-established, the probe 125 serves the function of re-establishing the orthogonality. Thus, the probe 125 may also propagate RF waves. These RF waves may have predominantly a capacitive or inductive coupling with the RF waves of the antennas 135 and/or 140. However, as will be discussed in detail below, the capacitive or inductive coupling is used to re-establish the isolation by way of polarization diversity which becomes antenna pairing orthogonality of the antennas 135, 140.

The probe 125 may continuously receive the signals and propagate corrective RF signals so long as the transceiver 115 and the antennas 135, 140 are operating. The continuous electronic establishing of the orthogonality may be done in a variety of manners. For example, measurements of the proper amplitude and RF phase angle may be taken whenever a change in the radiation pattern is sensed (e.g., due to a hand movement). In another example, the measurements may be taken at predetermined time intervals. In yet another example, a combination of the above examples may be used. It should be noted that with the addition of the probe 125, the MU 100 may further consider factors such as an amount of power, a phase angle of the signal that is applied to the probe 125, possible radiation of the probe 125, etc. when determining the proper amplitude and phase angle in order to electronically establish the orthogonality.

The MU 100 may become aware of the orthogonality being disrupted in a variety of manners. In a first exemplary embodiment, a lack of isolation that is demonstrated when a signal is applied to one antenna while an undesirable signal (e.g., too great a signal) is received at the other antenna may be used for the awareness. When the isolation is found to be deficient, the isolation may be corrected in an open loop manner or a closed loop manner. With reference to the open loop manner, signals of different amplitudes and phases may be injected into the two ports of the probe to measure whether the isolation between the antenna pair has improved or degraded. With reference to the closed loop manner, additional data relating to the quantitative (vector-like) coupling characteristics of each of the probe's ports to each of the antennas in the pair are used.

It should be noted that the use of a single probe 125 is only exemplary. According to the exemplary embodiments of the present invention, the MU 100 may include the single probe 125 that affects the propagating RF signals of both of the antennas 135, 140. In another exemplary embodiment, the probe 125 may only affect the propagating RF signals of one antenna to attempt to re-establish the polarization diversity. In yet another exemplary embodiment, the MU 100 may include a plurality of probes disposed at predetermined locations so that a polarization diversity may be dynamically maintained. For example, a pair of probes may be disposed near the antenna 135 while another pair of probes may be disposed near the antenna 140. The probes may only affect the propagating RF signals from their respective antenna.

Figure 3A:
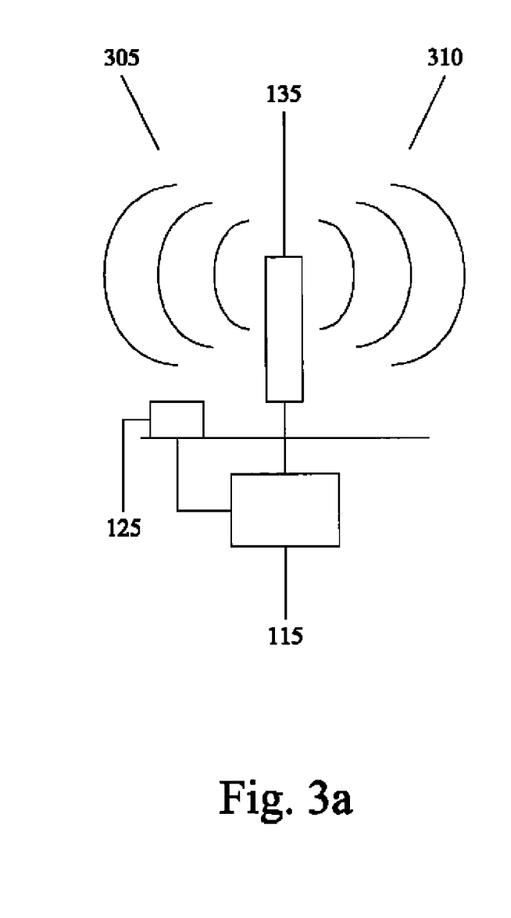
FIG. 3a shows an unaffected propagation of a radio frequency signal according to an exemplary embodiment of the present invention.
Figure 3B:
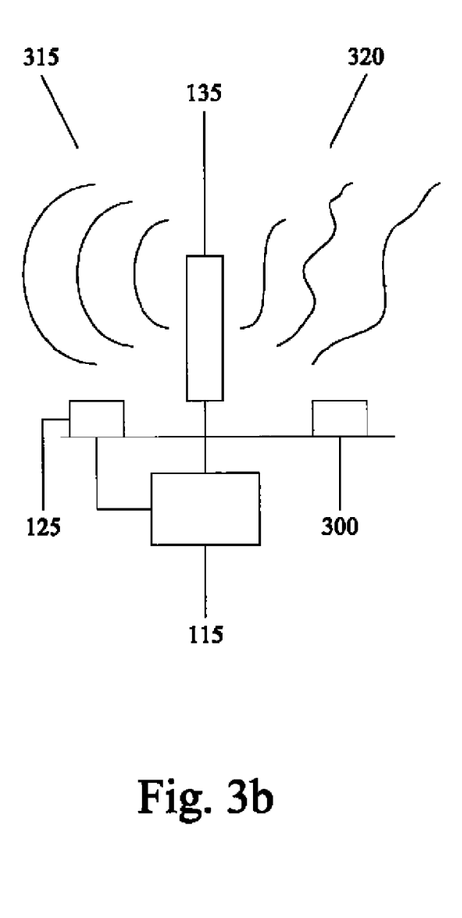
FIG. 3b shows an affected propagation of a radio frequency signal according to an exemplary embodiment of the present invention.
Figure 3C:
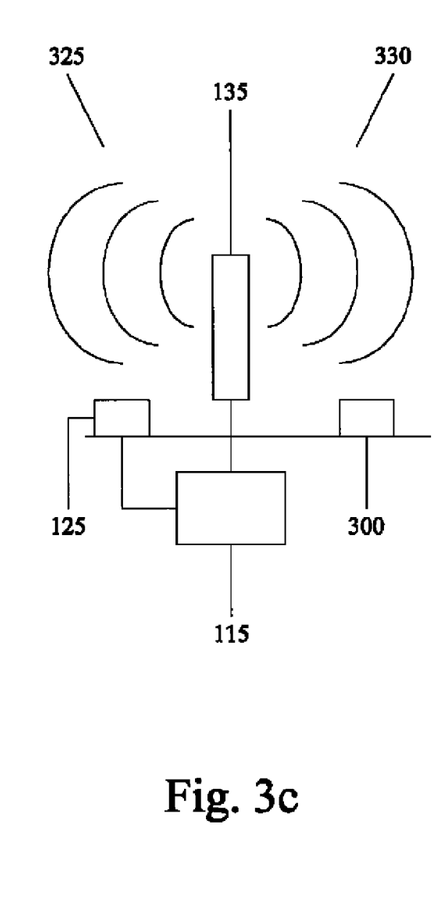
FIG. 3c shows an adapted propagation of a radio frequency signal according to an exemplary embodiment of the present invention.

FIGS. 3a-c illustrates a sequence in which the probe 125 may be used to establish an orthogonality. FIG. 3a shows an unaffected propagation of an RF signal according to an exemplary embodiment of the present invention. In FIG. 3a, the antenna 135 may be a radiating monopole. For illustrative purposes, a two-dimensional cross section of the propagation is considered. The cross section includes a left propagation 305 and a right propagation 310. In an unaffected state, the propagations 305, 310 travel as expected. Thus, the transceiver 115 feeds the antenna 135 while the probe 125 takes no action so that a proper orthogonal polarized diversity exists.

FIG. 3b shows an affected propagation of a radio frequency signal according to an exemplary embodiment of the present invention. FIG. 3b also illustrates the antenna 135 as a radiating monopole. FIG. 3b further illustrates that an object 300 is present and that the object 300 is in a location that affects the transmission of the antenna 135 by warping a phase front that previously was orthogonally polarized to the other monopole. Specifically, the left propagation 315 is less affected by the object 300 but the right propagation 320 is more affected by the object 300. The right propagation 320 is being simplistically represented as a warped phase front. Thus, the orthogonal polarized diversity may be affected. The two ports of the probe 125 may have signals applied to them from the transceiver 115 in order to transmit waves of a proper amplitude, polarization angle, and RF phase angle that the probe 125 must propagate in order to establish the orthogonal polarized diversity between the antenna pair.

FIG. 3c shows an adapted propagation of a radio frequency signal according to an exemplary embodiment of the present invention. FIG. 3c illustrates a resulting propagation upon the probe electronically establishing the orthogonal polarized diversity when the object 300 has caused an interference. The left propagation 325 may remain in a state that is substantially similar to the left propagation 305. The right propagation 330 may return to a state such as the right propagation 310 that is unaffected by the object 300. Thus, the probe 125 may re-establish the orthogonality to antenna 140 disposed in the area of the right propagation 330 and thus a greater antenna-to-antenna isolation exists between the antennas 135, 140.

Figure 4:
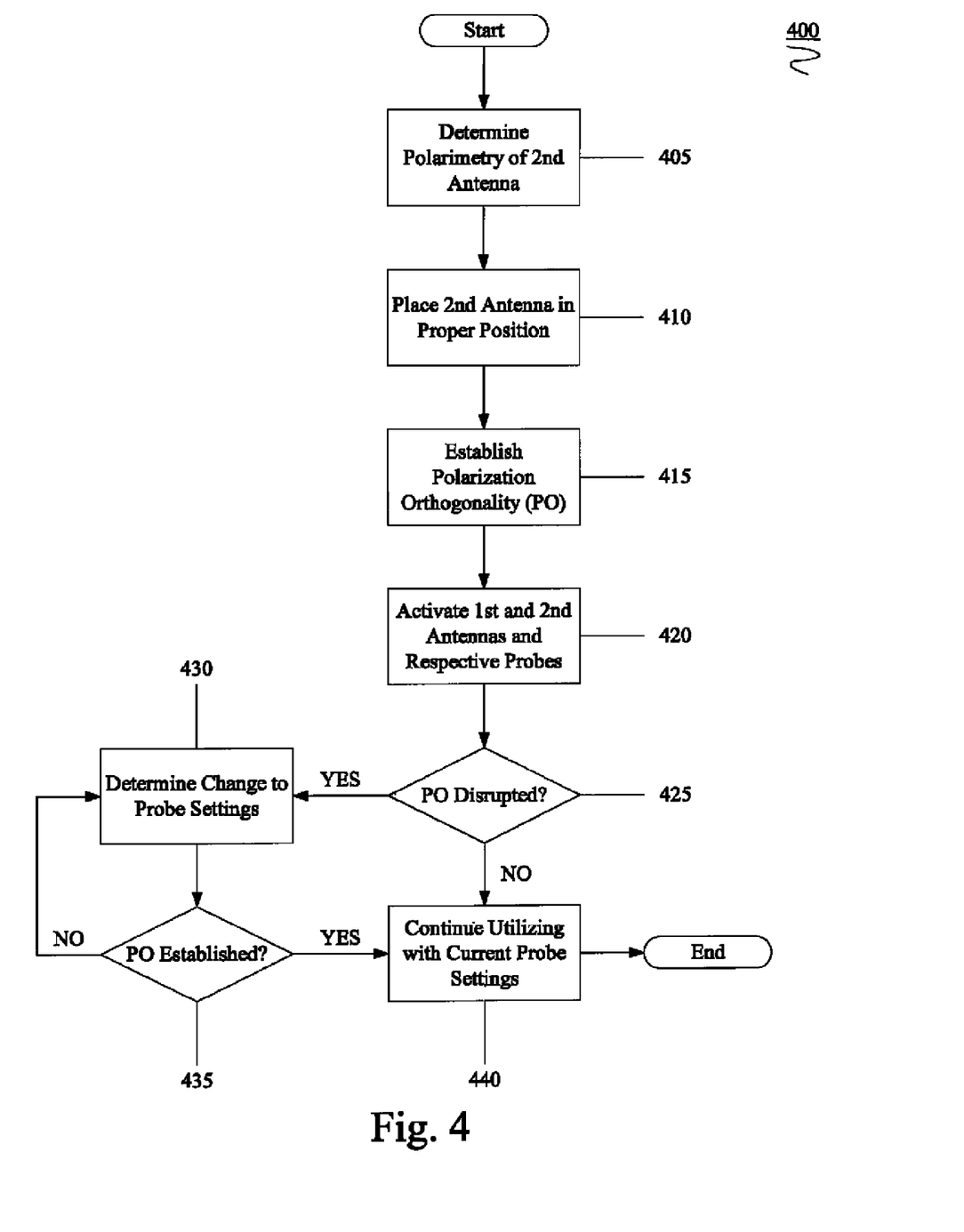
FIG. 4 shows a method for adaptive polarization diversity according to an exemplary embodiment of the present invention.

FIG. 4 shows a method 400 for adaptive polarization diversity according to an exemplary embodiment of the present invention. The method 400 will be described with reference to the MU 100 of FIG. 1 and the sequence illustrated in FIGS. 3a-c. The method 400 includes setting up the antennas 135, 140 and a subsequent use. It should be noted that the method 400 may be separated. That is, a set of steps may illustrate a proper setting up of the isolation between antennas 135, 140 while another set of steps may illustrate a use of the probe 125 and the antennas 135, 140 to exhibit a far field orthogonal polarized diversity condition when sensed at a distance that is external to the MU 100.

In step 405, a polarimetry of the antenna 140 is determined. As discussed above, the antennas 135, 140 are placed strategically so that an orthogonal polar diversity may be established. Furthermore, the antennas 135, 140 may be placed assuming that no interference is experienced when disposed at those locations. Thus, after arbitrarily placing the antenna 135, the polarimetry of the antenna 140 while the antenna 135 is transmitting may determine the placement of the antenna 140. Thus, in step 410, the antenna 140 is placed in the appropriate location with respect to the position of the antenna 135. Furthermore, in step 415, a polarization orthogonality (PO) is established because the antennas 135, 140 are placed in appropriate locations with appropriate orientations.

In step 420, the antennas 135, 140 and the probe 125 are activated for use. The activation of the antennas 135, 140 and the probe 125 may be done at different times. For example, the antennas 135, 140 may be activated automatically when the MU 100 is activated. In another example, the antennas 135, 140 may be automatically activated when a program that requires transmitting signals is activated. In yet another example, the antennas 135, 140 may be manually activated. The probe 125 may be automatically activated at any time the antennas 135, 140 are activated. Furthermore, the probe 125 may be activated manually by a user (e.g., to conserve the battery of the MU 100).

In step 425, by way of an isolation measurement, a determination is made whether the polarization orthogonality has been disrupted. As discussed above, the propagations from the antennas 135, 140 may experience interference from a variety of causes. For example, with reference to FIGS. 3b-c, the object 300 may be in a location that disrupts the propagation of the antenna 135. In particular, the object 300 may disrupt a near field radiation pattern. The object 300 may be, for example, a component of the MU 100, a component on a printed circuit board (e.g., when the antenna is internal), a user's hand, etc.

If step 425 determines that the polarization orthogonality has been disrupted, the method 400 continues to step 430. In step 430, changes to the settings of the probe are determined. For example, if the transceiver 115 is radiating signals through the antenna 135 and an interference exists, the probe 125 may receive signals relating to how the polarization orthogonality may be established. The signals may pertain to an amplitude and/or phase angle at which the antenna 135 is propagating. The potential changes to the settings of the probe may be calculated ad hoc. That is, the processor 105 may execute a program that considers various factors when determining the changes. In another example, the changes may be referenced to a database that includes a plurality of scenarios where the polarization orthogonality has been disrupted.

In step 435, by way of an isolation measurement, a determination is made whether the polarization orthogonality has been re-established. That is, the result of the probe 125 electronically attempting to establish the polarization orthogonality is tested. The signals fed to the probe 125 may have been influenced by other interferences (e.g., user's hand moving). Thus, determining if the polarization orthogonality has been established through the signals received by the probe 125 may be useful such as in the current use of the antennas 135, 140 and in subsequent uses of the antennas 135, 140.

If step 435 determines that the polarization orthogonality has not been established, the method 400 returns to step 430 where another change to the probe settings are determined. If step 435 determines that the polarization orthogonality has been established, the method 400 continues to step 440. The method 400 also reaches step 440 when step 425 determines that the polarization orthogonality has not been disrupted. In step 440, the current probe settings are used for transmissions through the antennas 135, 140.

It should be noted that the method 400 may iterate so long as the antennas 135, 140 are in use. After step 440, the method 400 may return to step 425 to further determine any disruptions to the polarization orthogonality. For example, a determination may have been made that the polarization orthogonality was disrupted. The source of the disruption may have been a user's finger located near the antenna. The user may subsequently shift the finger to another location that disrupts the polarization orthogonality. The iteration of the method 400 may dynamically ensure that the polarization orthogonality of the antennas 135, 140 remains established.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. An electronic device, comprising:
    a transceiver connected to a first antenna and a second antenna, the first and second antennas configured to one of transmit and receive radio frequency signals, the first and second antennas configured to exhibit a polarized diversity; and
    a probe re-establishing the polarized diversity when the polarized diversity has been disrupted by transmitting a set of signals via two ports of the probe, the signals indicating one of a predetermined amplitude and a predetermined phase angle.

2. The electronic device of claim 1, wherein the transmitted radio frequency signals from the first and second antennas are correlated.

3. The electronic device of claim 1, wherein the polarized diversity is orthogonal.

4. The electronic device of claim 3, wherein the orthogonal polarization includes the first antenna transmitting horizontally elliptically and the second antenna transmitting vertically elliptically.

5. The electronic device of claim 4, wherein a first axial ratio of a first ellipsis is substantially similar to a second axial ratio of a second ellipsis.

6. The electronic device of claim 1, wherein the first antenna includes an electric field vector that rotates clockwise and the second antenna includes an electric field vector that rotates counter-clockwise.

7. The electronic device of claim 1, further comprising:
    at least a second probe working with the probe to reestablish the polarized diversity when the polarized diversity has been disrupted.

8. The electronic device of claim 1, wherein a location of the second antenna is determined based on a polarimetry when the first antenna is transmitting.

9. The electronic device of claim 1, wherein the polarization diversity is disrupted by one of a component of the electronic device and an object located near at least one of the first and second antennas.

10. The electronic device of claim 1, wherein the first antenna is one of a dipole antenna, a loop antenna, a patch antenna, and a monopole antenna and the second antenna is one of a dipole antenna, a loop antenna, a patch antenna, and a monopole antenna.

11. A method, comprising:
    establishing a polarization diversity for a first antenna and a second antenna;
    determining whether the polarization diversity has been disrupted; and
    electronically feeding at least one of the first and second antennas using a probe to re-establish the polarization diversity when the polarization diversity has been disrupted by transmitting a set of signals via two ports of the probe, the signals indicating one of a predetermined amplitude and a predetermined phase angle.

12. The method of claim 11, wherein the polarization diversity is orthogonal.

13. The method of claim 12, wherein the orthogonal polarization includes the first antenna transmitting horizontally elliptically and the second antenna transmitting vertically elliptically.

14. The method of claim 13, wherein a first axial ratio of a first ellipsis is substantially similar to a second axial ratio of a second ellipsis.

15. The method of claim 11, wherein the first antenna includes an electric field vector that rotates clockwise and the second antenna includes an electric field vector that rotates counterclockwise.

16. The method of claim 11, wherein the probe electronically feeds the first antenna and a second probe electronically feeds the second antenna.

17. The method of claim 11, further comprising:
determining a location of the second antenna based on a polarimetry when the first antenna is transmitting.

18. The method of claim 11, wherein the polarization diversity is disrupted by one of a component of the electronic device and an object located near at least one of the first and second antennas.

19. The method of claim 11, wherein the first antenna is one of a dipole antenna, a loop antenna, a patch antenna, a monopole antenna and a PIFA antenna and the second antenna is one of a dipole antenna, a loop antenna, a patch antenna, a monopole antenna, and a PIFA antenna.

20. An electronic device, comprising:
a transceiver connected to a first antenna and a second antenna to one of transmit and receive radio frequency signals, the first and second antennas configured to exhibit a polarized diversity to increase an isolation between the first antenna and the second antenna; and a controlling means for re-establishing the polarized diversity to increase an isolation between the first antenna and the second antenna when the polarized diversity has been disrupted by transmitting a set of signals via two ports of the controlling means, the signals indicating one of a predetermined amplitude and a predetermined phase angle.

\* \* \* \* \*